US009488826B2

(12) United States Patent
Shin et al.

(10) Patent No.: US 9,488,826 B2
(45) Date of Patent: Nov. 8, 2016

(54) ELECTROWETTING DISPLAY DEVICE HAVING BANKS OF DIFFERENT HYDROPHILICITIES AND METHOD FOR MANUFACTURING THE SAME

(71) Applicant: Amazon Technologies, Inc., Seattle, WA (US)

(72) Inventors: Sang-Min Shin, Cheonan-si (KR); Woo-Song Kim, Hwaseong-si (KR); Chang-Ku Hua, Seoul (KR); Soo-Jin Park, Seoul (KR); Mun-Soo Park, Suwon-si (KR)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/936,396

(22) Filed: Nov. 9, 2015

(65) Prior Publication Data

US 2016/0062106 A1    Mar. 3, 2016

Related U.S. Application Data

(62) Division of application No. 13/730,096, filed on Dec. 28, 2012, now Pat. No. 9,182,588.

(30) Foreign Application Priority Data

Dec. 30, 2011    (KR) ......................... 10-2011-0147311

(51) Int. Cl.
*G02B 26/02* (2006.01)
*G02B 26/00* (2006.01)

(52) U.S. Cl.
CPC ........... *G02B 26/005* (2013.01); *G02B 26/007* (2013.01)

(58) Field of Classification Search
CPC .............. G02B 26/005; G02B 26/004; G02B 2207/115; G02B 26/02; G09G 2300/0426; G09G 3/3433
USPC ................................. 359/228, 291, 295, 665
See application file for complete search history.

(56) References Cited

U.S. PATENT DOCUMENTS

| 7,746,540 B2 | 6/2010 | Lo et al. | |
| 9,182,588 B2 * | 11/2015 | Shin ..................... | G02B 26/007 |
| 2009/0046082 A1 | 2/2009 | Jacobson et al. | |
| 2010/0284056 A1 * | 11/2010 | Giraldo ............... | G02B 26/004 |
| | | | 359/292 |
| 2013/0329274 A1 | 12/2013 | Yang et al. | |

* cited by examiner

*Primary Examiner* — James Phan
(74) *Attorney, Agent, or Firm* — Lee & Hayes, PLLC

(57) ABSTRACT

Disclosed is an electrowetting display device including a plurality pixels. Each pixel includes a pixel electrode, a hydrophobic layer, a hydrophobic fluid, and a bank adapted to limit the range of movement of the hydrophobic fluid. The bank has a hydrophobic bank surface and a hydrophilic bank surface, which face each other. The hydrophobic fluid is moved from the hydrophilic bank surface towards the hydrophobic bank surface by the application of a voltage to the pixel electrode.

26 Claims, 10 Drawing Sheets

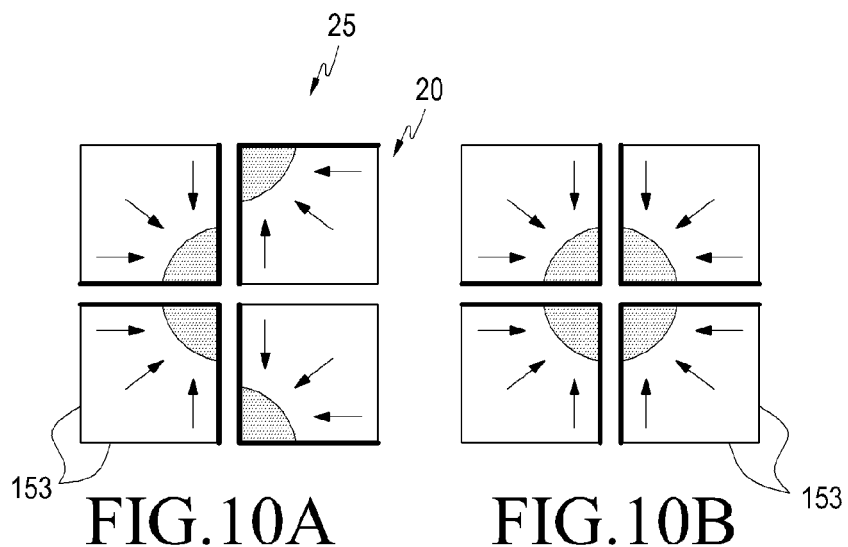
FIG.10A    FIG.10B
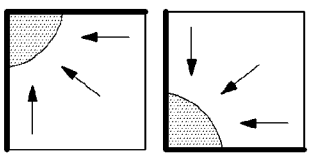   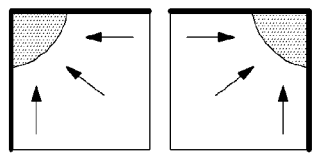
FIG.10C    FIG.10D
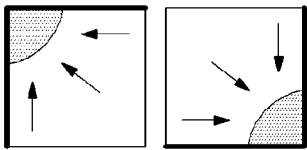   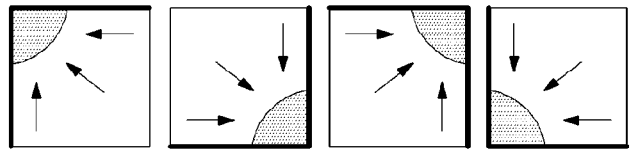
FIG.10E    FIG.10F

ELECTROWETTING DISPLAY DEVICE HAVING BANKS OF DIFFERENT HYDROPHILICITIES AND METHOD FOR MANUFACTURING THE SAME

CROSS REFERENCE TO RELATED APPLICATION

This application is a divisional of and claims priority to U.S. patent application Ser. No. 13/730,096, filed Dec. 28, 2012, now U.S. Pat. No. 9,182,588, issued Nov. 10, 2015, which claims priority from and the benefit of Korean Patent Application No. 10-2011-0147311, filed Dec. 30, 2011, which are hereby incorporated by reference for all purposes as if fully set forth herein.

BACKGROUND

1. Field

The present invention relates to an electrowetting display device and a method for manufacturing the same, and more particularly to an electrowetting display device having banks of different hydrophilicities/hydrophobicities and a method for manufacturing the same.

2. Discussion of the Background

An electrowetting effect refers to the change of contact angle between a conductive hydrophobic fluid and a hydrophobic layer positioned beneath the fluid, when a voltage is selectively applied to the fluid. Specifically, the smaller the voltage applied to the hydrophobic fluid is, the smaller the contact angle between the hydrophobic fluid and the hydrophobic layer becomes. The smaller the contact angle is, in turn, the larger the surface area of the hydrophobic fluid on the hydrophobic layer becomes.

An electrowetting display device is based on such an electrowetting effect. FIGS. 1A and 1B are sectional views of a pixel of a conventional electrowetting display device.

The electrowetting display device 10 includes a first substrate 100, a hydrophobic fluid 210 positioned on the first substrate 100, a hydrophilic fluid 230 positioned on the hydrophobic fluid 210 and which is immiscible with the hydrophobic fluid 210, and a second substrate 190 positioned over the hydrophilic fluid 230.

The first substrate 100 includes a first basic substrate 110, a first pixel electrode 120 formed on the first basic substrate 110, and a hydrophobic layer 130 formed on the pixel electrode 120. Banks 140 are formed on parts of the hydrophobic layer 130 to limit the movement of the hydrophobic fluid 210. The hydrophobic fluid 210 includes a pigment of a predetermined color. When the pixel electrode 120 is provided with no voltage, the hydrophobic fluid 210 is distributed over the entire hydrophobic layer 130, as shown in FIG. 1A, and the pixel displays the color of the pigment. The hydrophilic fluid 230 is transparent and is arranged on the hydrophobic fluid 210.

In order for the display device 10 to display a predetermined image, voltages of a predetermined gradation level are applied to the pixel electrode 120 of each pixel. When a voltage is applied to the pixel electrode 120, as shown in FIG. 1B, a part of the hydrophobic fluid 210 at the center of the layer is broken up, and then the hydrophobic fluid 210 moves towards the banks 140 positioned on edges of the pixel electrode. In order to guarantee that the breakup occurs at a constant position, the pixel further includes an auxiliary electrode 125 positioned separate from the pixel electrode 120 and provided with a voltage different from the pixel electrode 120. However, even the existence of the auxiliary electrode 125 cannot guarantee that the hydrophobic fluid 210 consistently brakes up.

Such breakup of the hydrophobic fluid 210 requires that a high voltage (e.g. 30 volts) be applied to the pixel electrode. However, high-voltage driving of the display device increases its power consumption, and the resulting electrolysis of fluids creates bubbles of oxygen or hydrogen gas as impurities inside the display device, degrading the display quality.

A satisfactory level of image display quality may require that the hydrophobic fluid of each pixel be distributed in the same position and area with regard to a predetermined gradation level. However, the inconsistency of the initial breakup position of the hydrophobic fluid makes it difficult to adjust the position and area of the hydrophobic fluid. Furthermore, the position and area of the hydrophobic fluid change, even if the pixel voltage is the same, during splitting and reunion of the hydrophobic fluid (hysteresis phenomenon), making it difficult to determine a voltage level with regard to a predetermined gradation level. Therefore, there is a need to design a display device in such a manner that fluids can also be driven at a low voltage, no unwanted gas is produced, and the fluids have the same position and area at a predetermined gradation level, as well as a method for manufacturing the same.

BRIEF SUMMARY OF THE INVENTION

Exemplary embodiments of the present invention provide an electrowetting display device that can be driven at a low voltage.

Further, exemplary embodiments of the present invention provide an electrowetting display device having fewer impurities.

Further, exemplary embodiments of the present invention provide an electrowetting display device configured to enable prediction and adjustment of the movement of hydrophobic and hydrophilic fluids.

Further, exemplary embodiments of the present invention provide a method for manufacturing an electrowetting display device having excellent display quality.

Exemplary embodiments of the present invention provide an electrowetting display device including a unit pixel that has banks of different hydrophilicities/hydrophobicities.

Additional features of the invention will be set forth in the description which follows, and in part will be apparent from the description, or may be learned by practice of the invention.

In accordance with an aspect of the present invention, there is provided an electrowetting display device comprising: a first substrate; a second substrate facing the first substrate; and pixels formed between the first and second substrates. Each pixel comprises: a pixel electrode disposed on the first substrate; a hydrophobic layer disposed on the pixel electrode; a hydrophobic fluid disposed on the hydrophobic layer; a bank disposed on the hydrophobic layer and surrounding the hydrophobic fluid, the bank comprising first and second bank surfaces that face the hydrophobic fluid, and hydrophilicity of the first bank surface is different from hydrophilicity of the first bank surface; and a hydrophilic fluid disposed on the hydrophobic fluid. The pixel electrode is configured to form an electric field and thereby move the hydrophobic fluid with respect to the first and second bank surfaces.

In accordance with another aspect of the present invention, there is provided a method of manufacturing an electrowetting display device, the method including: forming a pixel electrode on a first substrate; forming a hydrophobic layer on the pixel electrode; forming a bank on the hydrophobic layer, the bank having a first bank surface, a second bank surface, and an upper bank surface; and radiating UV rays onto the bank at an oblique angle with respect to the plane of the hydrophobic layer, in an oxygen-containing atmosphere, to increase the hydrophilicity of portions of the bank.

In accordance with another aspect of the present invention, there is provided a method of manufacturing an electrowetting display device, the method including: forming a pixel electrode on a first substrate; forming a hydrophobic layer on the pixel electrode; radiating light through an exposure mask disposed below the first substrate, to expose a portion of the negative photoresist; etching the un-exposed portion of the negative photoresist to form a bank having a first bank surface, a second bank surface, and an upper bank surface; and radiating UV rays onto the bank from above the first substrate, to increase hydrophilicity of the first bank surface, or the upper bank surface, or both the upper and first bank surfaces.

In accordance with another aspect of the present invention, there is provided a method of manufacturing an electrowetting display device, the method including: forming a pixel electrode on a first substrate; forming a hydrophobic layer on the pixel electrode; forming a bank on the hydrophobic layer, the bank having a first bank surface that extends at an oblique angle with respect to the plane of the first substrate, a second bank surface, and an upper surface; and radiating the bank with UV rays using a hydrophilicity modification mask having an opening and a light shield.

In accordance with another aspect of the present invention, there is provided an electrowetting display device comprising: a first substrate; a second substrate facing the first substrate; and pixels formed between the first and second substrates. Each pixel comprises: a pixel electrode disposed on the first substrate; a hydrophobic layer disposed on the pixel electrode; a hydrophobic fluid disposed on the hydrophobic layer; a bank disposed on the hydrophobic layer and surrounding the hydrophobic fluid, the bank comprising first and second bank surfaces that face the hydrophobic fluid, the first surface being hydrophilic and the second bank surface being hydrophobic; and a hydrophilic fluid disposed on the hydrophobic fluid. The pixel electrode is configured to form an electric field that causes the hydrophobic fluid to move towards the second bank surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 10A, 10B, 10C, 10D, 10E, and 10F are schematic top views of different pixel groups, illustrating hydrophilic bank surfaces arranged in various positions.

DETAILED DESCRIPTION OF THE ILLUSTRATED EMBODIMENTS

Figure 1A:
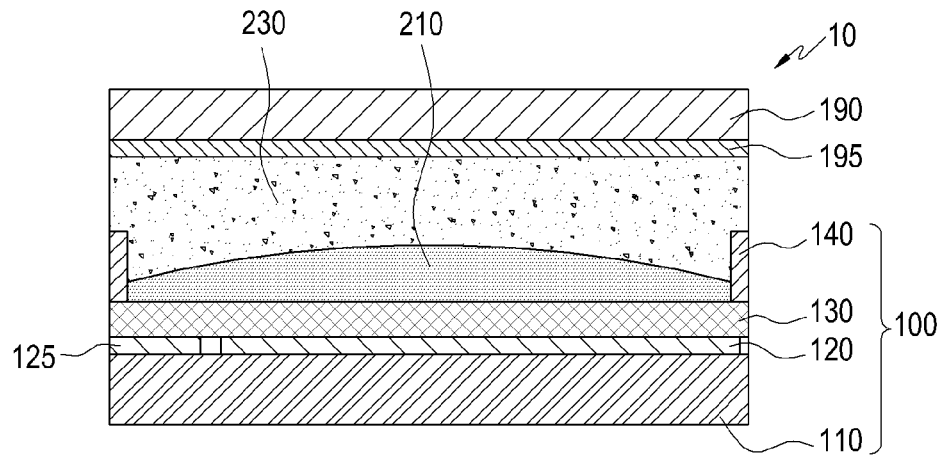
FIGS. 1A and 1B are magnified sectional views of a schematic pixel of an electrowetting display device, according to an exemplary embodiment of the present invention.
Figure 1B:
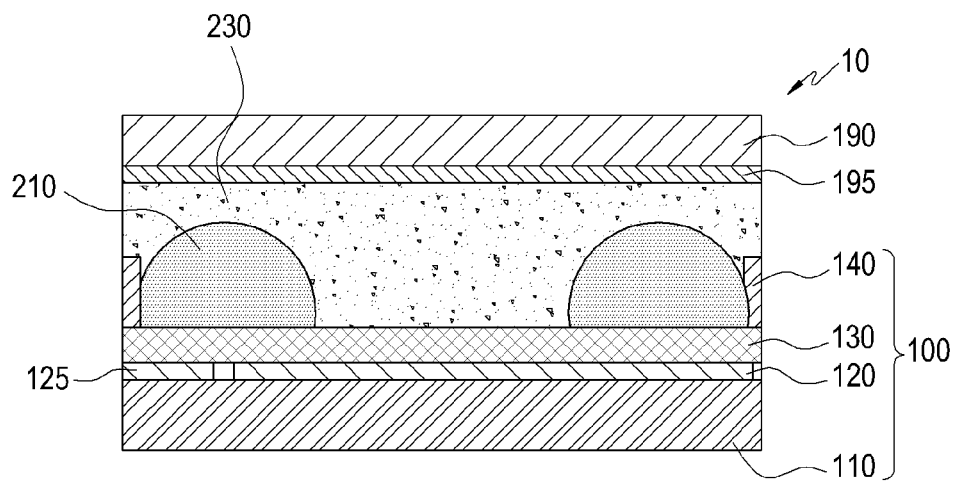

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

According to various embodiments, bank surfaces included in a unit pixel of an electrowetting display device are arranged towards hydrophobic fluids and have different hydrophilicities. A hydrophobic fluid, when a pixel electrode is provided with a voltage, moves from a bank surface that is relatively more hydrophilic, towards a bank surface that is relatively more hydrophobic. The thickness of an edge of the hydrophobic fluid adjacent to the hydrophilic bank surface is smaller than that of the other edge. When the pixel electrode is provided with a voltage, the hydrophobic fluid moves from the thinner edge towards the thicker edge.

The hydrophilic bank can be formed by supplying energy and oxygen at an oblique angle to a hydrophobic bank. Alternatively, the hydrophilic bank can be formed using a material different from that of the hydrophobic bank. The hydrophobic fluid moves from the edge of its layer and thus, can be moved by an electric field produced by a low voltage. In addition, during its contraction and expansion, the path of movement is substantially constant, thereby reducing a hysteresis phenomenon.

Figure 2A:
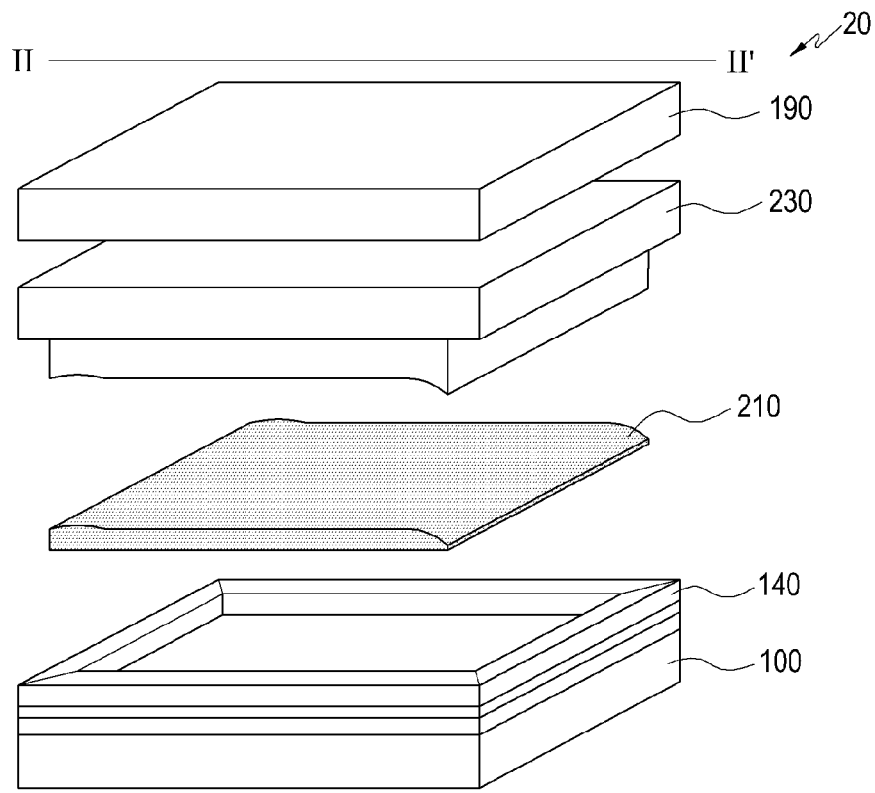
FIGS. 2A and 2B are a schematic exploded perspective view and a sectional view magnifying a pixel including a hydrophobic fluid, which has a different thickness according to the position, according to an embodiment of the present invention.
Figure 2B:
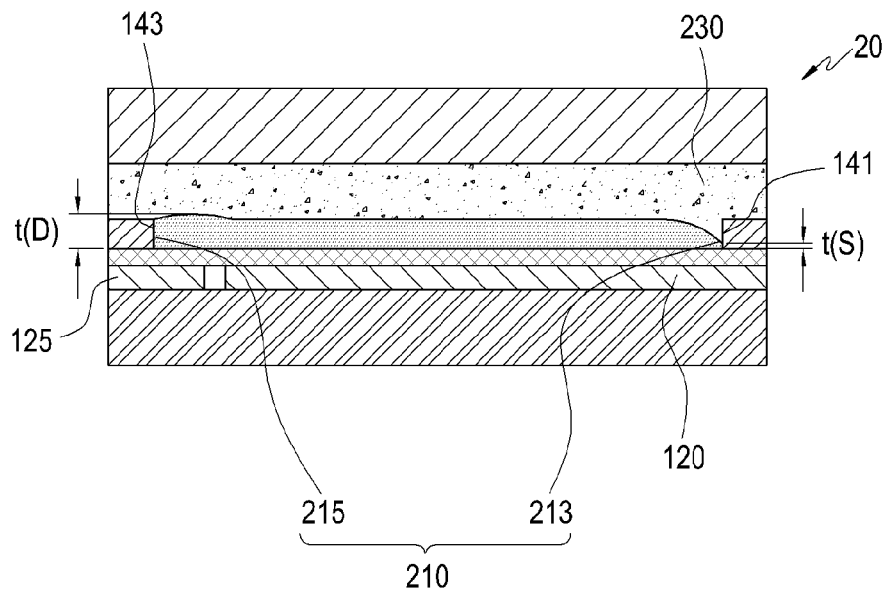

FIGS. 2A and 2B are a schematic exploded perspective view and a sectional view illustrating a pixel 20 of an electrowetting display device, according to an exemplary embodiment of the present invention. While only one pixel 20 is shown, the display device may include a plurality of the pixels 20.

Referring to FIGS. 2A and 2B, the pixel 20 includes first and second substrates 100 and 190, a pixel electrode 120 and an auxiliary electrode 125 disposed on the first substrate 100, a hydrophobic layer 130 disposed on the pixel electrode 120 and the auxiliary electrode 125, and a bank 140 disposed on the hydrophobic layer 130. A hydrophobic fluid 210 and a polar hydrophilic fluid 230 disposed between the first and second substrates 100 and 190. The bank 140 includes opposing first and second bank surfaces 141 and 143, which are lateral surfaces facing the inside of the pixel 20. The hydrophobic fluid 210 has a first edge 213 that contacts the first bank surface 141 and has a thickness of t(S), and a second edge 215 that contacts the second bank surface 143 and has a thickness of t(D).

The thickness t(S) of the first edge 213 is smaller than the thickness t(D) of the second edge 215, and is larger than 0. When a voltage is applied to the pixel electrode 120 from outside the pixel 20, the hydrophobic fluid 210 moves from the thin first edge 213 towards the thick second edge 215. As the hydrophobic fluid 210 moves, the polar hydrophilic fluid 230 moves into the space vacated by the hydrophobic fluid 210. The variations in the thickness of the hydrophobic fluid 210 can be obtained by modifying the physical properties of the bank 140 or the shape of the bank 140.

FIGS. 3A-3E are simplified sectional views of the pixel 20, which illustrate the movement of hydrophilic and hydrophobic fluids according to the level of a voltage applied to the pixel electrode 120.

Referring to FIGS. 2B and 3A-3E, the pixel electrode 120 and the auxiliary electrode 125 are arranged beneath the hydrophobic fluid 210, and a common electrode 127 is arranged on the hydrophilic fluid 230. The common electrode 127 is disposed on the second substrate 190. The auxiliary electrode 125 is provided with a voltage of the same level as that applied to the common electrode 127, and the pixel electrode 120 is provided with a variable voltage, which is interlinked with the transmittance value of an image to be displayed by the pixel 20. According to various embodiments, the first and second bank surfaces 141 and 143 have different hydrophilicities. The higher the hydrophilicity of a bank surface, the larger the angle between the hydrophobic fluid and the bank surface, i.e., a contact angle (CA), becomes. Further, the lower the hydrophilicity (the higher the hydrophobicity) of the bank surface, the smaller the contact angle. It is to be noted that the simulation of FIGS. 3A-3E is based on conditions enumerated in Table 1 below.

TABLE 1

| Pixel size | 160 um × 160 um |
|---|---|
| Pixel electrode width | 108 um |
| Auxiliary electrode width | 33 um |
| Interval between pixel and auxiliary electrodes | 7 um |
| Voltage of common electrode | 30 volts |
| Voltage of auxiliary electrode | 30 volts |
| Voltage of pixel electrode | 0-30 volts |
| Cell gap | 44 um |
| Hydrophobic fluid | Decane |

TABLE 1-continued

| Hydrophilic fluid | Solution of mixture of ethylene glycol and glycerin at 2:1 weight ratio |
|---|---|
| Width of first and second banks | 12 um |
| Height of first and second banks | 4 um |
| Contact angle of first and second bank upper surfaces | 170° |
| Contact angle of first bank surface | 110° |
| Contact angle of second bank surface | 90° |

Figure 3A:
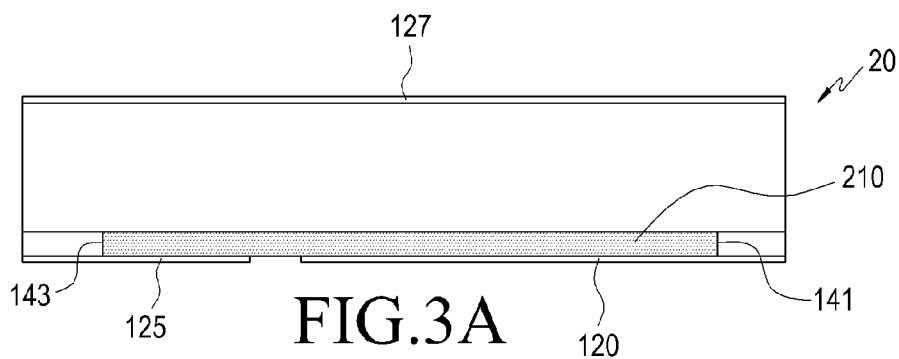
FIGS. 3A, 3B, 3C, 3D and 3E are sectional views of pixels illustrating the distribution of hydrophilic and hydrophobic fluids of pixels when different pixel voltages are applied.
Figure 3B:
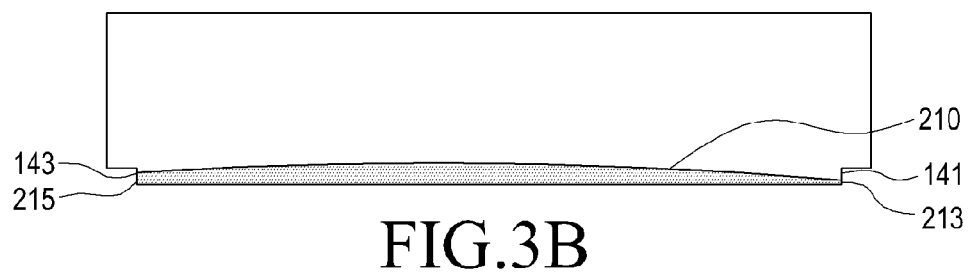
Figure 3C:
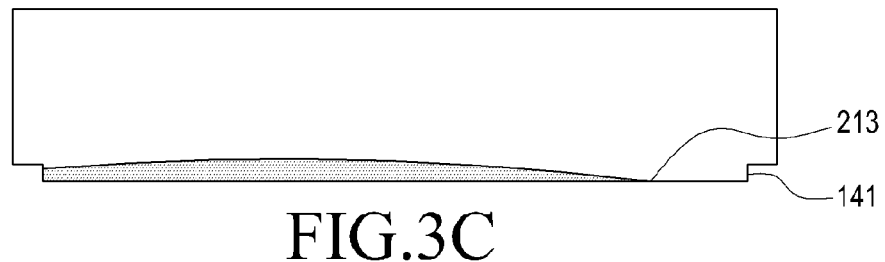
Figure 3D:
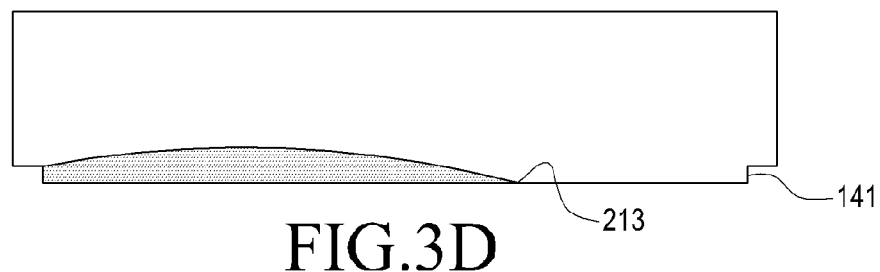
Figure 3E:

FIGS. 3A-3D illustrate the position of the hydrophobic fluid 210, when the pixel electrode 120 is applied with a pixel voltage of 0 volt, 10 volts, 20 volts, and 30 volts, respectively. Referring to FIG. 3B, the first edge 213 of the hydrophobic fluid 210 contacts a part of the first bank surface 141, and the second edge 215 contacts the entire second bank surface 143. Therefore, the first edge 213 of the hydrophobic fluid 210 is thinner than the second edge 215. Referring to FIGS. 3B-3D, the first edge 213 of the hydrophobic fluid 210 retreats from the first bank surface 141, according to the level of the pixel voltage applied to the pixel electrode (see, FIG. 2B).

As can be seen, the hydrophobic fluid 210 retreats from the first bank surface 141 to the second bank surface 143. The bank surface 141 may be made hydrophilic by irradiating the bank surface 141 with UV rays, in an ozone atmosphere.

Figure 4A:
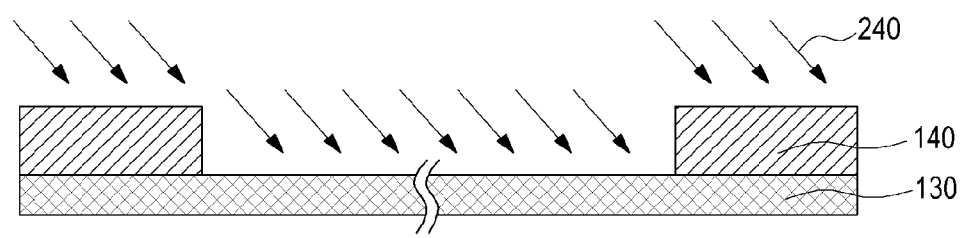
FIGS. 4A and 4B are sectional views illustrating a process of modifying the surface characteristics of a bank.
Figure 4B:
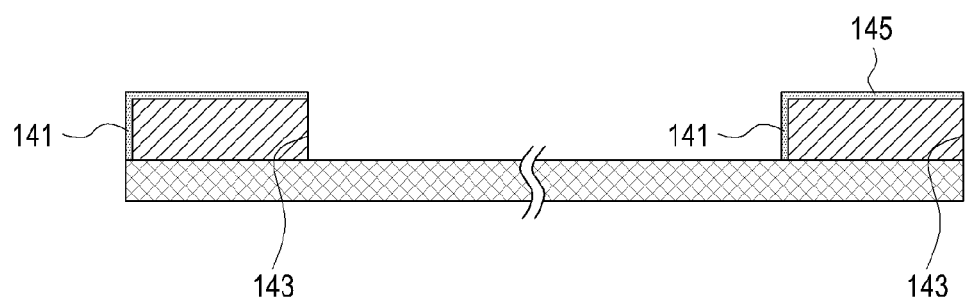

FIGS. 4A and 4B are sectional views illustrating a process making portions of the bank 140 hydrophilic. It is to be noted that, for clarity of description, various elements (e.g. electrodes) have been omitted in the drawings. The bank 140 in FIG. 4A is formed by applying a negative photoresist, such as SU-8, to the hydrophobic layer 130, selectively irradiating only portions that are to form the bank 140, and etching the negative photoresist so that unexposed portions are removed. The above-mentioned method can form the bank 140 approximately perpendicular to the direction of extension of the hydrophobic layer 130.

The bank 140 is irradiated with UV rays 240 in an ozone atmosphere. For example, in the case of SU-8 molecules shown in Formula (1) below, their epoxy group is broken by ozone, and the resulting increase in polarity increases the hydrophilicity.

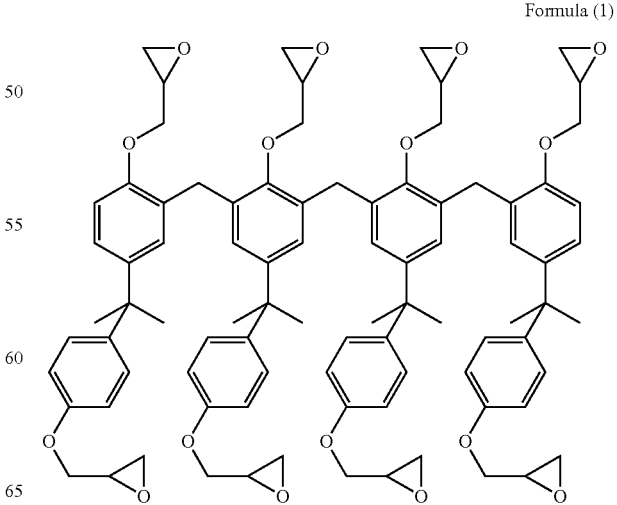

Formula (1)

UV rays can be radiated at an oblique angle to the hydrophobic layer 130, in order to make portions of the bank hydrophilic. In the case of a bank 140 made of SU-8, for example, UV rays having wavelengths of 185 nm and 254 nm can be radiated at an oblique angle to the bank 140. UV rays of 185 nm decompose oxygen molecules in the air and generate oxygen radicals, which combine with other oxygen molecules and become ozone radicals. The ozone or oxygen radicals, in conjunction with UV-rays of 254 nm, break the epoxy bonds of the SU-8, thereby increasing the polarity of SU-8 molecules. The SU-8 can thus be made hydrophilic.

Oblique radiation of UV rays 240 to the bank 140 increases the hydrophilicity of an upper surface 145 of the bank 140 and the first bank surface 141, which are irradiated with UV rays 240. However, the second bank surface 143 is not irradiated with UV rays and remains highly hydrophobic. The resulting bank 140, as shown in FIG. 4B, has a hydrophilic first bank surface 141 and a hydrophobic second bank surface 143.

Figure 5A:
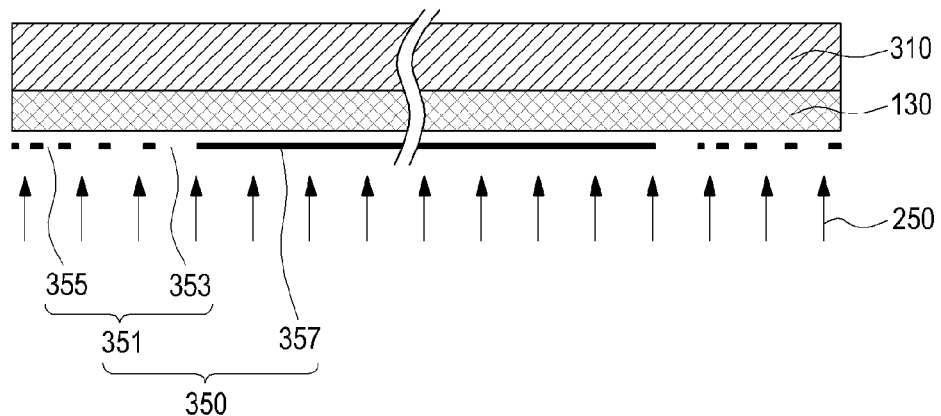
FIGS. 5A, 5B, and 5C are sectional views illustrating a process of manufacturing bank surfaces having different extension directions and surface characteristics.
Figure 5B:
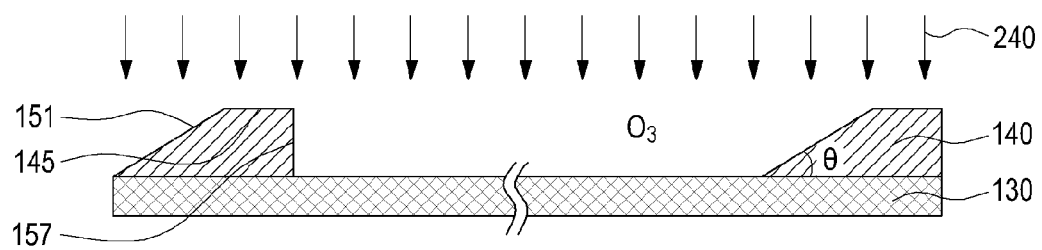
Figure 5C:
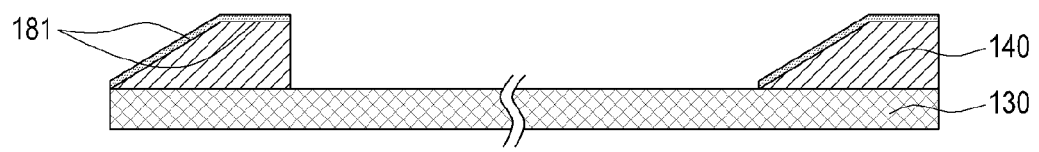

FIGS. 5A-5C are sectional views illustrating a processes of manufacturing a bank having different orientations, according to various embodiments. It is to be noted that, for clarity of description, some components are omitted in the drawings. Referring to FIG. 5A, a negative photoresist 310 is applied to a hydrophobic layer 130. An exposure mask 350 having various sizes of openings 351 is arranged beneath the hydrophobic layer 130. Light 250 is radiated through the openings 351 of the exposure mask 350 to expose the negative photoresist 310, which may be SU-8, for example.

The exposure mask 350 includes a light shield 357, through-holes 353, and slit openings 355. The light shield 357 prevents light from reaching a corresponding area of the photoresist 310. The through-holes 353 allow a first amount of light to reach corresponding areas of the photoresist 310. The slit openings 355 allow a limited amount of light to reach corresponding areas of the photoresist 310, and the widths of the slit openings 355 can vary gradually, as shown in FIG. 5A, such that the largest slit opening 355 is disposed adjacent to the through-hole 353. In other words, the slit openings 355 convert received light into a light gradient.

The exposure process shown in FIG. 5A, when completed, forms a vertical bank surface 157 extending perpendicular to the hydrophobic layer 130, an oblique bank surface 151 extending at an oblique angle to the hydrophobic layer 130, and a bank upper surface 145 arranged between the vertical bank surface 157 and the oblique bank surface 151, as shown in FIG. 5B. In order to endow the bank surfaces 145, 151, and 157 with different surface characteristics, the method of irradiating the bank 140 with UV rays 240 in an ozone (O$_3$) atmosphere, as described with reference to FIG. 4A, may be employed. Considering that the hydrophilicity/hydrophobicity of the bank surfaces 145, 151, and 157 depends on the direction of radiation of UV rays 240, in order to increase the hydrophilicity of the oblique bank surface 151, UV rays 240 can be radiated between the angle θ, which is formed between the oblique bank surface 151 and the surface of the hydrophobic layer 130.

Those skilled in the art can understand that, although not shown in the drawings, UV rays 240 can be alternatively radiated between the direction of extension of the hydrophobic layer from the point of view of the vertical bank surface 157 and the angle θ, which is defined between the oblique bank surface 151 and the hydrophobic layer 130, in order to increase the hydrophilicity (decrease the hydrophobicity) of the vertical bank surface 157 and the bank upper surface 145, without changing the surface characteristics of the oblique bank surface 151.

FIG. 5B illustrates radiation of UV rays 240 to the bank 140 in a direction perpendicular to the surface of the hydrophobic layer 130. This results in an increase of the polarity of molecular structure of the oblique bank surface 151 and the bank upper surface 145, which become hydrophilic layers 181 shown in FIG. 5C.

Figure 6A:
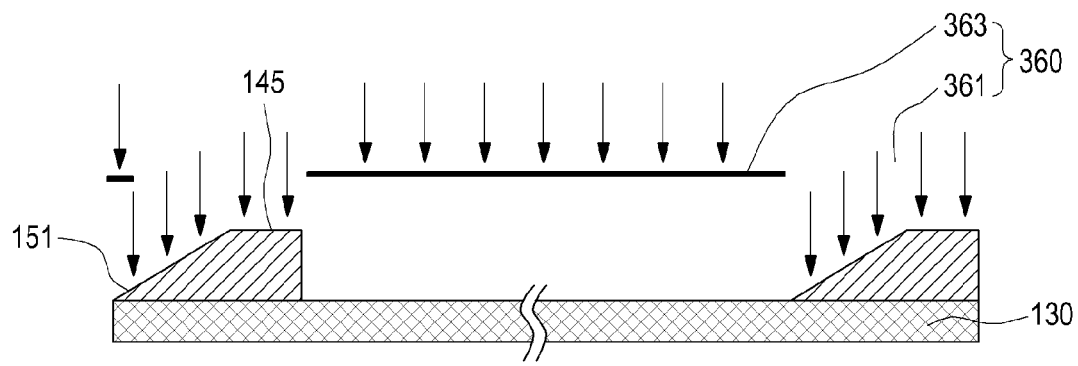
FIGS. 6A and 6B are sectional views illustrating a process of modifying the surface characteristics of a bank.
Figure 6B:
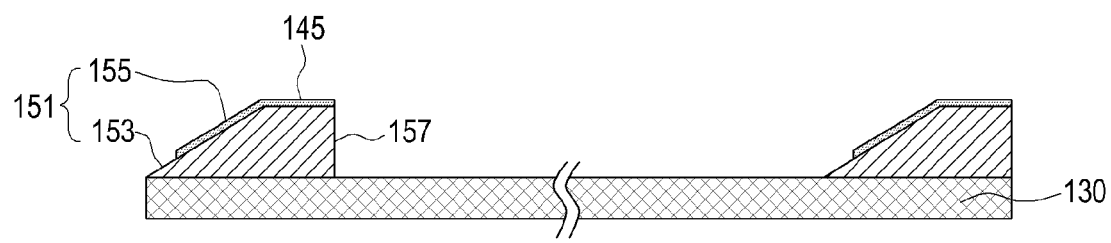

A process of turning the entire oblique bank surface 151 into a highly hydrophilic bank surface 181 has been described, but it is also possible to make only a portion of the oblique bank surface 151 hydrophilic, while the remaining portion remains hydrophobic. FIGS. 6A and 6B are sectional views illustrating a process of changing the surface characteristics of a bank. FIG. 6A illustrates a hydrophilicity modification mask 360, which is adapted to irradiate parts of an oblique bank surface 151 with UV rays 240 radiated from above the mask. The hydrophilicity modification mask 360 has openings 361 and a light shield 363. The openings 361 face a portion of the mask 360 that corresponds to a portion of the oblique bank surface 151, and a portion of the mask 360 that corresponds to the bank upper surface 145. The light shield 363 is disposed adjacent to the openings 361 are formed.

As shown in FIG. 6A, UV rays 240, which are radiated from above the mask 360 in a direction perpendicular to the hydrophobic layer 130, reach only a portion of the oblique bank surface 151, increasing the hydrophilicity of the portion. Therefore, as shown in FIG. 6B, the oblique bank surface 151 includes a hydrophobic bank surface 153 and a hydrophilic bank surface 155. It is to be noted that it is still possible to form, on a single oblique bank surface 151, portions 153 and 155 having different surface characteristics, even when the light shield 363 is alternatively formed only on a portion of the mask corresponding to the hydrophilic portion 155 of the oblique bank surface 151. It is also to be noted that the process of modifying hydrophilicity shown in FIG. 6A can be combined with the process of radiating UV rays in an ozone atmosphere described and illustrated in FIG. 4A.

Figure 6C:
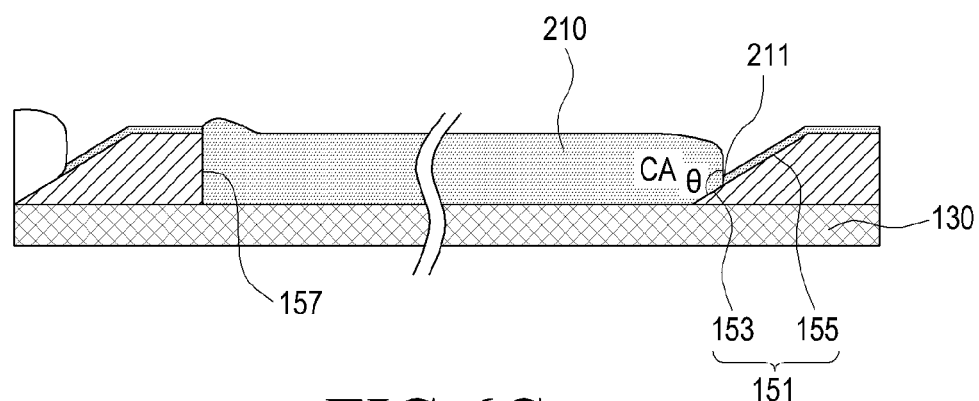
FIG. 6C is a sectional view illustrating the pixel of FIG. 6B when filled with a hydrophobic fluid.

Through a following fluid injection process, the pixel shown in FIG. 6B can be filled with a hydrophobic fluid 210, as shown in FIG. 6C. Referring to FIG. 6C, the oblique bank surface 151 includes a hydrophilic bank surface 155 disposed above a hydrophobic bank surface 153. The hydrophobic fluid 210, can be distributed to cover the top of the hydrophobic layer 130 and the hydrophobic bank surface 153, and such distribution of the hydrophobic fluid 210 can prevent degradation of contrast ratio of the display device, due to light leakage from the pixel.

The hydrophobic fluid 210 can have an edge positioned at the boundary between the hydrophobic bank surface 155 and the hydrophilic bank surface 153. Alternatively, when there is a large amount of hydrophobic fluid 210, the hydrophobic fluid can have an edge 211 positioned on the hydrophilic bank surface 155. In either case, the edge 211 of the hydrophobic fluid has a contact angle CA larger than 90°, and its thickness is smaller than that of the other part of the hydrophobic fluid 210. The hydrophobic fluid 210 thus has an asymmetric overall shape, i.e., is thicker at the hydrophobic vertical bank surface 157 and is thinner at the oblique bank surface 151. Therefore, when a predetermined pixel voltage is applied to the pixel electrode (not shown) positioned beneath the hydrophobic layer 130, the hydrophobic fluid can easily move from the oblique bank surface 151 towards the hydrophobic vertical bank surface 157.

Figure 7A:
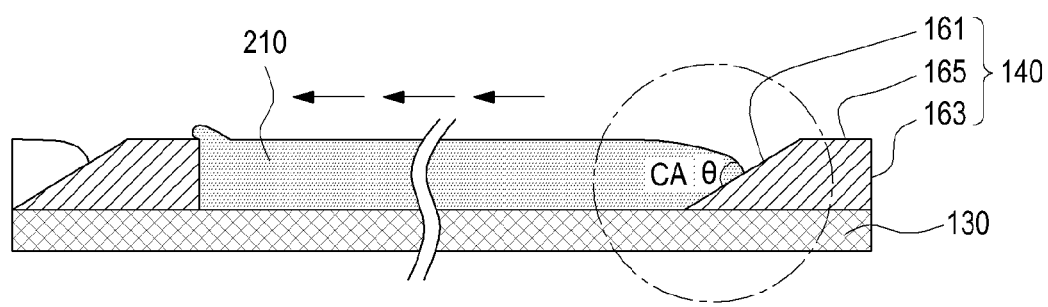
FIG. 7A is a schematic sectional view of a pixel illustrating a hydrophobic fluid near an oblique bank surface and near a vertical bank surface.
Figure 7B:
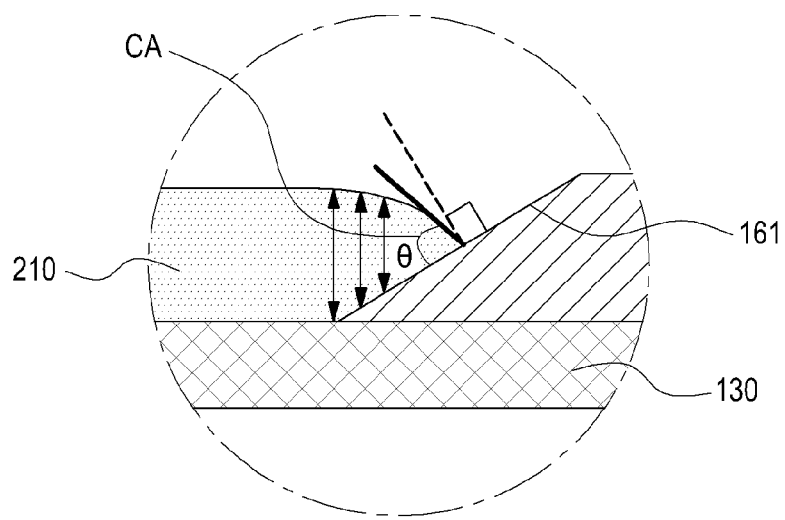
FIG. 7B magnifies part VII of FIG. 7A.

Although it has been described that different hydrophilicities of banks vary the thickness of the hydrophobic fluid according to position, the variation of thickness in a different position can also be obtained by the varying shape of the bank or the bank surface. FIG. 7A is a schematic sectional view of a pixel illustrating thickness differences of the hydrophobic fluid 210. FIG. 7B illustrates part VII of FIG. 7A.

Referring to FIGS. 7A and 7B, the bank 140 has a hydrophobic oblique bank surface 161, a hydrophobic vertical bank surface 163, and a hydrophilic upper bank surface 165. Referring to FIG. 7B, the contact angle CA between the hydrophobic fluid 210 and the hydrophobic oblique bank surface 161 is smaller than 90°, meaning that the thickness of the hydrophobic fluid 210 on the oblique bank surface 161 is less than that on the hydrophobic layer 130. Therefore, application of a pixel voltage to the pixel electrode (not shown) arranged beneath the hydrophobic layer 130 can commence a movement of the hydrophobic fluid 210 from the oblique bank surface 161 towards the vertical bank surface 163 of the adjacent bank. Those skilled in the art can understand that, although the vertical bank surface 163 is shown in FIGS. 7A and 7B as being perpendicular to the direction of extension of the hydrophobic layer 130, the angle between the vertical bank surface 163 and the hydrophobic layer 130 is not limited thereto, as long as it is larger than the angle between the oblique bank surface 161 and the hydrophobic layer 130.

Figure 8A:
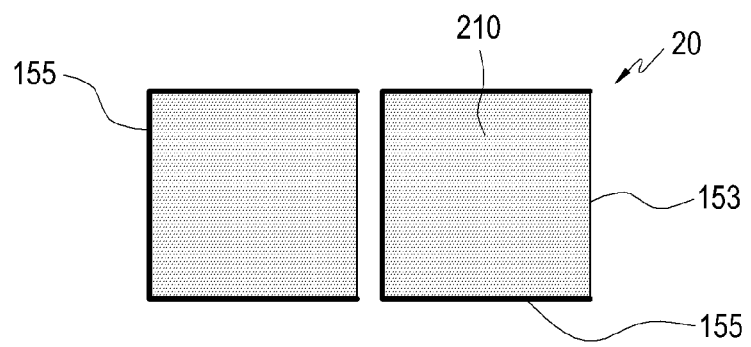
FIGS. 8A and 8B are schematic top views of pixels illustrating the movement of fluid included in two adjacent pixels.
Figure 8B:
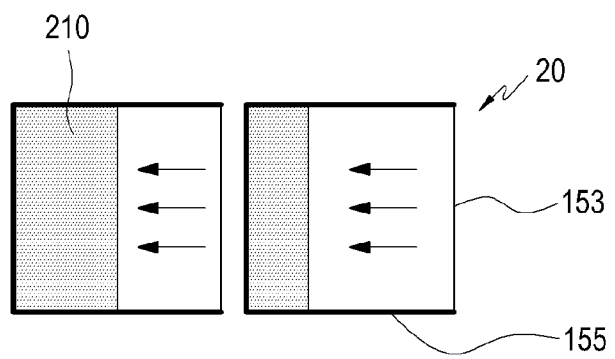

According to various embodiments, the hydrophobic fluid included in pixels can move in a single direction or in different directions. FIGS. 8A and 8B are schematic top views of pixels illustrating the same direction of fluid movement in two adjacent pixels. Referring to FIG. 8A, a lowest gamma level signal is applied to a pixel electrode (not shown) included in a pixel 20, and the hydrophobic fluid 210 is accordingly distributed over the pixel 20. Among bank surfaces formed in the method described and illustrated in FIGS. 4-7, three bank surfaces within a pixel are hydrophobic bank surfaces 155, and the remaining one bank surface is a hydrophilic bank surface 153. As shown in FIG. 8A, the hydrophilic bank surfaces 153 are positioned on the right side of respective pixels 20. Therefore, the hydrophilic bank surfaces 153 can be manufactured through a simple process. For example, if the process of radiating UV rays obliquely illustrated in FIGS. 4A and 4B is employed, the hydrophilic bank surfaces 153 can be formed through only one oblique radiation process, making it possible to manufacture pixels for a reduced manufacturing time and/or at a low manufacturing cost.

Referring to FIG. 8B, when pixel electrodes (not shown) are provided with signals of a predetermined gamma level, hydrophobic fluid 210 included in respective pixels 20 moves away from the hydrophilic bank surfaces 153. Those skilled in the art can easily understand that, since pixel electrodes of respective pixels are provided with signals of different gamma levels in FIG. 8B, the hydrophobic fluids have different distribution areas.

Figure 9A:
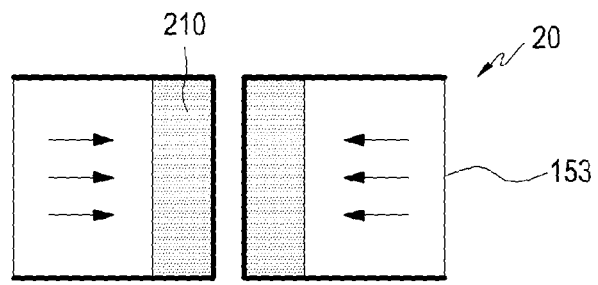
FIGS. 9A, 9B, and 9C are schematic top views of pixel groups, illustrating hydrophilic banks of pixels arranged in different positions.
Figure 9B:
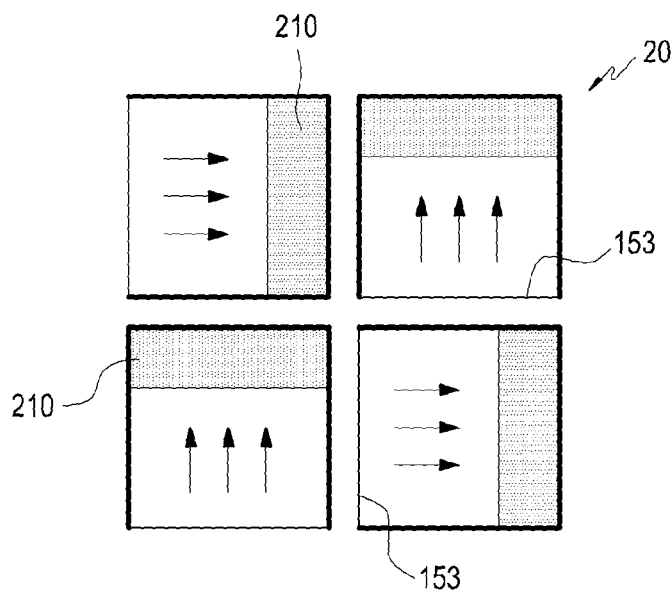
Figure 9C:
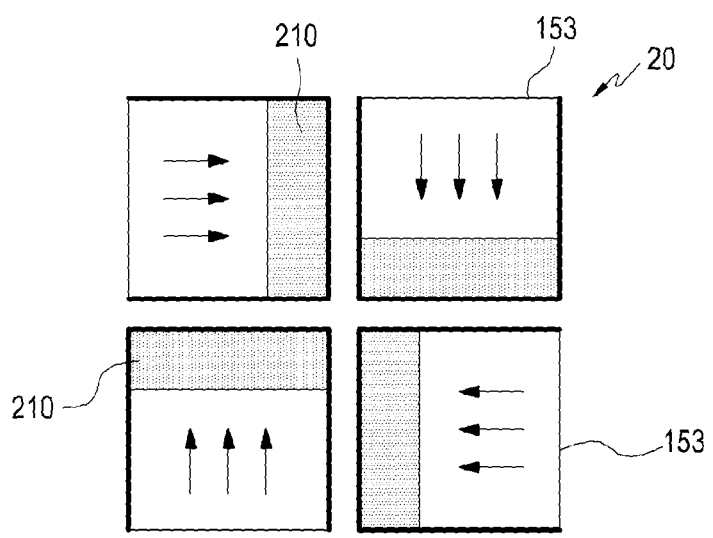

The hydrophilic bank surfaces 153 can be arranged in various positions of respective pixels, so that the hydrophobic fluids can move in different directions. FIGS. 9A-9C are schematic top views of pixel groups, illustrating hydrophilic banks of pixels arranged in different positions. Referring to FIG. 9A, adjacent pixels 20 have hydrophilic bank surfaces 153 arranged on the left or right side of the pixels 20. When the display device is driven, pixel electrodes (not shown) are provided with predetermined gradation voltage levels, and the hydrophobic fluids 210 move away from the hydrophilic bank surfaces 153, due to an electric field corresponding to each voltage level. It is to be noted that the directions of movement of the hydrophobic fluids 210 are marked by arrows in respective pixels.

The hydrophilic bank surfaces 153 are arranged in intersecting directions, so that the hydrophobic fluids 210 move to the right or left of the pixels 20. If the pixels of FIG. 9A are adapted to display the same gradation level of the same color, similar images can be observed from the right or left side of the display device.

The intersecting arrangement of hydrophobic bank surfaces can be obtained, when the oblique UV radiation method shown in FIG. 4 is employed, for example, by using a mask for forming the left bank surface and another mask for forming the right bank surface. Those skilled in the art can easily understand that hydrophilic bank surfaces can be arranged in intersecting positions, as shown in FIG. 9A, also by radiating UV rays while moving a mask, or by radiating UV rays from opposite locations of the same mask.

In the case of a pixel group, which is a set of pixels displaying the same gradation of the same color, the hydrophobic fluid included in the pixels can be distributed in various positions, including the pixel's right portion, left portion, upper portion, and lower portion. Referring to FIG. 9B, the hydrophilic bank surfaces 153 of the four pixels are arranged in intersecting directions, and the hydrophobic fluids 210 are also arranged in intersecting directions in conformity with the positions of the hydrophilic bank surfaces 153. Therefore, substantially the same images can be viewed from the top/bottom/left/right of the display device. FIG. 9C illustrates a group of pixels having hydrophobic fluids arranged in the shape of a pinwheel, and, as in the case of the pixel groups shown in FIG. 9B, the uniformity of images viewed in different directions can be improved.

Although only one bank surface of a pixel of a pixel group is hydrophilic in the above-mentioned cases, it is also possible that two adjacent bank surfaces are hydrophilic. FIGS. 10A-10F are schematic top views of different pixel groups, illustrating each pixel 20 having two adjacent hydrophilic bank surfaces 153, which are arranged in various positions. The pixel group 25 can be a group of pixels representing the same color, when voltages of the same gradation level are applied to their respective pixel electrodes.

Referring to FIG. 10A, the pixel group 25 has four adjacent pixels 20, each of which has two adjacent hydrophilic bank surfaces 153. When a voltage of a predetermined gradation level is applied to the pixel electrode (not shown), the hydrophobic fluids 210 move away from the hydrophilic bank surfaces 153, and the hydrophobic fluids 210 in each pixel 20 are disposed in different relative locations. Therefore, the display device makes it possible to observe uniform images from different directions.

FIGS. 10b-10F are schematic top views of pixel groups, illustrating hydrophilic bank surfaces distributed in various positions in corresponding pixels. Those skilled in the art can easily understand that hydrophobic fluids in respective pixels move in directions marked by arrows, and respective hydrophilic bank surfaces are made using one or a number of hydrophilicity modification masks, according to the method described and illustrated in FIG. 4, for example.

The electrowetting display device having banks of different hydrophilicities according to the present invention is advantageous in that it has less impurities, it can be driven at a low voltage, and it has less hysteresis. Other advantages, which have been described in the detailed description, will be easily understood by those skilled in the art.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electrowetting display device comprising:
   a pixel electrode on a first substrate;
   a hydrophobic layer on the pixel electrode;
   a first fluid on the hydrophobic layer;
   a bank on the hydrophobic layer and at least partially surrounding the first fluid, wherein the bank comprises first and second bank surfaces that face the first fluid, and wherein the first bank surface extends at an oblique angle with respect to a plane that includes the hydrophobic layer, and the second bank surface extends orthogonally with respect to the plane that includes the hydrophobic layer; and
   a second fluid disposed on the first fluid.

2. The electrowetting display of claim 1, wherein the first fluid comprises a hydrophobic fluid and the second fluid comprises a hydrophilic fluid.

3. The electrowetting display device of claim 1, wherein the bank further comprises:
   a lower surface disposed directly on the hydrophobic layer; and
   an opposing upper surface that extends from the first bank surface and is hydrophilic.

4. The electrowetting display device of claim 1, wherein the first bank surface comprises:
   a hydrophilic portion adjacent to the upper surface; and
   a hydrophobic portion adjacent to the hydrophobic layer.

5. The electrowetting display device of claim 1, wherein:
   the bank comprises four sidewalls that surround the first fluid;
   the first bank surface is located on a first one of the sidewalls; and
   the second bank surface is located on second, third and fourth ones of the sidewalls.

6. The electrowetting display device of claim 1, wherein:
   the bank comprises four sidewalls that surround the first fluid;
   the first bank surface is located on two adjacent ones of the sidewalls; and
   the second bank surface is located on the remaining sidewalls.

7. The electrowetting display device as claimed in claim 1, wherein the first and second bank surfaces are located on opposing sides of the bank.

8. The electrowetting display device as claimed in claim 7, wherein a portion of the first bank surface is hydrophobic.

9. The electrowetting display device as claimed in claim 7, wherein the first bank surface comprises the hydrophilic portion and a hydrophobic portion, and the hydrophobic portion is located closer to the first substrate than the hydrophilic portion.

10. The electrowetting display device as claimed in claim 1, wherein:
    the first and second bank surfaces are located on opposing sides of the hydrophobic fluid.

11. The electrowetting display device as claimed in claim 10, wherein the pixel electrode forms an electric field in adjacent ones of the pixels that moves the first fluid in different directions when a pixel voltage is applied to the pixel electrodes of the adjacent ones of the pixels.

12. The electrowetting display device as claimed in claim 11, wherein adjacent ones of the pixels are configured to display the same color.

13. The electrowetting display device as claimed in claim 1, wherein:
    the bank comprises four sidewalls;
    the first bank surface is located on two adjacent ones of the four sidewalls;
    the second bank surface is located on two other adjacent ones of the four sidewalls; and
    the first fluid is moved from the first bank surface towards the second bank surface by an electric field formed by the pixel electrode.

14. The electrowetting display device as claimed in claim 13, wherein hydrophobic fluids of adjacent pixels are moved in different directions by corresponding electric fields formed by pixel electrodes of the adjacent pixels.

15. The electrowetting display device as claimed in claim 13, wherein the thickness of an edge of the first fluid facing the first bank surface is smaller than the thickness of an edge of the first fluid facing the second bank surface.

16. The electrowetting display device as claimed in claim 15, wherein, when no voltage is applied to the pixel electrode, the first fluid contacts the first and second bank surfaces.

17. The electrowetting display device as claimed in claim 1, wherein:
    the first and second bank surfaces are located on opposing sides of the first fluid; and
    the first bank surface comprises a hydrophobic portion.

18. The electrowetting display device as claimed in claim 17, wherein the contact angle between the first fluid and the first bank surface is smaller than the contact angle between the first fluid and the second bank surface.

19. The electrowetting display device as claimed in claim 18, wherein the contact angle between the first fluid and the first bank surface is smaller than 90°.

20. The electrowetting display device as claimed in claim 1, wherein hydrophilicity of the first bank surface is different from hydrophilicity of the second bank surface.

21. A method of manufacturing an electrowetting display device, the method comprising:
    providing a pixel electrode on a substrate;
    providing a hydrophobic layer on the pixel electrode;
    providing a bank on the hydrophobic layer, wherein the bank includes a first bank surface that extends at an oblique angle with respect to a plane that includes the substrate; and
    illuminating the bank using ultraviolet light and a hydrophilicity modification mask having an opening and a light shield to modify hydrophilicity of the bank.

22. The method as claimed in claim 21, wherein illuminating the bank using ultraviolet light comprises illuminating the bank using ultraviolet light over the entire first bank surface.

23. The method as claimed in claim 21, wherein illuminating the bank using ultraviolet light comprises illuminating the bank using ultraviolet light such that a portion of first bank surface is not illuminated with the ultraviolet light.

24. The method as claimed in claim 23, wherein the non-illuminated portion of the first bank surface is a portion of the first bank surface that is disposed closest to the hydrophobic layer.

25. The method as claimed in claim 21, wherein illuminating the bank using ultraviolet light comprises illuminating the bank using ultraviolet light such that the ultraviolet light generates ozone that reacts with the bank.

26. An electrowetting display device comprising:
a pixel electrode on a first substrate;
a hydrophobic layer on the pixel electrode;
a first fluid on the hydrophobic layer;
a bank on the hydrophobic layer and at least partially surrounding the first fluid, wherein the bank comprises first and second bank surfaces that face the first fluid, and wherein the first bank surface extends at an oblique angle with respect to a plane that includes the hydrophobic layer, and wherein the first and second bank surfaces are both hydrophobic; and
a second fluid disposed on the first fluid.

* * * * *